United States Patent [19]

Tanaka et al.

[11] Patent Number: 5,114,828
[45] Date of Patent: May 19, 1992

[54] OPTICAL INFORMATION RECORDING MEDIUM CONTAINING LINEAR ACRYLIC RESIN

[75] Inventors: Tokuji Tanaka; Etsuji Akimoto; Seiichi Ohta, all of Hyogo, Japan

[73] Assignee: Daicel Chemical Industries, Ltd., Osaka, Japan

[21] Appl. No.: 511,171

[22] Filed: Apr. 19, 1990

[51] Int. Cl.$^5$ .............................................. G03C 1/93
[52] U.S. Cl. ..................................... 430/272; 430/945; 428/64; 428/442; 428/429
[58] Field of Search .............. 430/272, 945; 428/64, 428/442, 429

[56] References Cited

U.S. PATENT DOCUMENTS

| | | | |
|---|---|---|---|
| 3,911,444 | 10/1975 | Lou et al. | 430/945 X |
| 4,118,540 | 10/1978 | Amort et al. | 428/429 X |
| 4,656,118 | 4/1987 | Ohara et al. | 430/272 |
| 4,663,276 | 5/1987 | Ochiai et al. | 430/272 |
| 4,707,820 | 11/1987 | Sawamura | 346/135.1 |
| 4,845,515 | 7/1989 | Suh | 346/135.1 |

FOREIGN PATENT DOCUMENTS

| | | | |
|---|---|---|---|
| 59-65953A | 4/1984 | Japan | 428/429 |
| 59-227049A | 12/1984 | Japan | 428/442 |
| 63-228436A | 9/1988 | Japan | 428/64 |

Primary Examiner—Cynthia Hamilton
Attorney, Agent, or Firm—Birch, Stewart, Kolasch & Birch

[57] ABSTRACT

An optical information recording medium comprising a glass base, a primer coating layer formed on the glass base and a recording layer formed on the primer coating layer is disclosed. The optical information recording medium is characterized in that the primer coating layer comprises a linear acrylic resin having as a repeating unit an atomic group represented by the following formula (1):

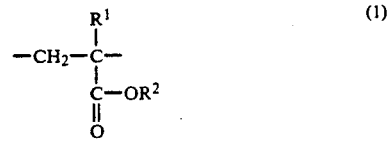

wherein $R^1$ is a hydrogen atom or a methyl group and $R^2$ is an alkyl group having 1 to 4 carbon atoms. A coupling agent may be interposed between the primer coating layer and the recording layer.

10 Claims, No Drawings

OPTICAL INFORMATION RECORDING MEDIUM CONTAINING LINEAR ACRYLIC RESIN

BACKGROUND OF THE INVENTION

The present invention relates to an optical information recording medium wherein information can be recorded and reproduced by making use of a laser beam, and more particularly to an optical information recording medium comprising a primer coating layer formed on a glass base and formed on said primer coating layer a recording layer capable of recording and reproducing information through the use of a laser beam.

In the so-called "direct-read-after-write recording medium" wherein information is recorded by taking advantage of an irreversible change in the characteristics or geometry, a low-melting metal, such as tellurium or bismuth, and its alloy, compound or dispersion have hitherto been used as a recording layer.

A disk, card, etc. provided with or without a guide groove and made of a plastic such as a polycarbonate resin or an acrylic resin have come to be used as a base serving as a support of a recording layer. A glass base, particularly a disk-shaped base has been used in applications particularly where reliability is required, such as computer applications, or applications in an environment susceptible to vibration, such as in an aircraft. The glass base is classified into one having a guide groove formed by the so-called 2 P process which comprises providing on a glass plate a thin layer of a photocurable resin in an uncured state, transferring a guide groove from a stamper and photocuring the resin, and a guide groove-free glass base. The latter has a drawback that when a recording layer of a low-melting metal, such as tellurium or bismuth, and its alloy, compound, etc. is directly provided on a glass base, the recording sensitivity during recording by a laser beam is lower than that in the case where a plastic base and a glass plate having a guide groove formed by the above-described 2 P process are used.

For this reason, an attempt to improve the sensitivity has been made through provision of some primer coating layer on a glass base and provision of a recording layer thereon. An improvement in the recording sensitivity can be attained when an organic polymer layer is used as the primer coating layer. However, it has been found that the use of the organic polymer layer brings about a problem in the reliability of an optical recording medium due to poor adhesion between the organic polymer layer as the primer coating layer and the glass base.

The present inventors have made various studies on the material for the primer coating layer with a view on solving the above-described problem and, as a result, have found that the use of a layer comprising a certain kind of organic polymer as the primer coating layer improves the adhesion between the undercoating layer and the glass base and brings about an improvement in the recording sensitivity, which has led to the completion of the present invention.

SUMMARY OF THE INVENTION

An object of the present invention is to provide an optical information recording medium having a high reliability and a high recording sensitivity and provided with a primer coating layer having good adhesion to a glass base and capable of improving the recording sensitivity.

According to the present invention, there is provided an optical information recording medium comprising a glass base, a primer coating layer formed on said glass base and a recording layer formed on said primer coating layer, wherein said primer coating layer comprises a linear acrylic resin having as a repeating unit an atomic group represented by the following formula (1):

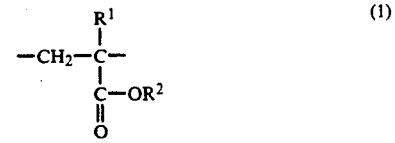

wherein $R^1$ is a hydrogen atom or a methyl group, and $R^2$ is an alkyl group having 1 to 4 carbon atoms.

DESCRIPTION OF THE PREFERRED EMBODIMENTS

The above-described glass base to be used in the present invention is known in the art, and one which is transparent to a laser beam used and causes neither absorption nor diffusion of the laser beam is available. Although the base is generally in a disk form, it may be in a card or drum form. In the case of optical disk recording media called "direct-read-after-write" and "erasable" recording media, it is a common practice to form a tracking groove on a base by the replica method in advance or write a track on a recording film after the formation of the recording film on a flat base. In the present invention, a flat glass base is mainly used. It is also possible to use a glass base having a tracking groove etc. previously formed by cutting, etching, etc.

The linear acrylic resin used in the present invention is a homopolymer of a methacrylate monomer, such as methyl methacrylate, ethyl methacrylate or butyl methacrylate and/or an acrylate monomer, such as methyl acrylate or ethyl acrylate, or a copolymer resin prepared by copolymerizing two or more of the above-described monomers. Among the above-described resins, polymethyl methacrylate is particularly preferably used. Further, a copolymer of methyl methacrylate with other ester of methacrylic acid or a copolymer of methyl methacrylate with an ester of acrylic acid is also preferably used. Among the above-described resins, the copolymer of methyl methacrylate with methyl acrylate is particularly preferably used.

It is also possible to use a copolymer of at least one of the above-described esters of methacrylic acid and/or esters of acrylic acid with other vinyl monomers copolymerizable with these esters, such as styrene, acrylonitrile or maleic anhydride.

In the present invention, the primer coating layer should contain the above-described linear acrylic resin. If necessary, plasticizers, ultraviolet absorbers, antioxidants, organic pigments, etc. may be added thereto.

In the present invention, a coupling agent may be used for the purpose of enhancing the adhesion between the primer coating layer and the glass base. Examples of the coupling agent include silane coupling agents including A-174, A-187 and A-1100, each a product of Nippon Unicar Co., Ltd., and titanate coupling agents including KR-TTS, KR-44 and KR-106, each a product of Kenrich Petrochemicals, Inc. The above-described coupling agent may be added to a coating solution for the primer coating layer. Alternatively, the glass plate may be treated with the above-described coupling agent, and then coated with a primer coating layer.

There is no particular limitation on the kind of the recording layer used in the present invention. For example, various recording layers, such as pit formation type, changeable phase type and magneto-optical recording layers may be used, which enables any of the direct-read-after-write and erasable optical recording media to be prepared. Specific examples of the recording layer for the direct-read-after-write optical recording medium include tellurium alloys, e.g., Te-Se, Te-As, Te-Sb, Te-In, Te-Sn, Te-Pb, Te-Bi, Te-Se-Ti, Te-Se-Ti-Ag and Te-Ge; oxides of tellurium; dispersions of tellurium, e.g. Te-C and Te-CS$_2$; multilayered film, e.g., Sb-Se/Bi-Te. Examples of the recording layer for the erasable optical recording medium include those made of magneto-optical materials, such as Tb-Fe, Tb-Fe-Co, Gd-Tb-Fe and Nd-Dy-Fe-Co and further those made of changeable phase materials, such as oxides of tellurium, In-Sb, Ge-Sn, Si-Sn and In-Sb-Se.

In the present invention, there is no particular limitation on the thickness of the primer coating layer. However, when a flat base is used as the glass base, a thickness of 0.01 to 10 $\mu$m is preferred. On the other hand, when a glass base having a tracking groove etc. previously formed by cutting, etching, etc. is used, a thickness of 0.001 to 0.1 $\mu$ is preferred.

In the present invention, the primer coating layer may be provided by dissolving the above-described linear acrylic resin and optionally other additives in a suitable solvent and applying the resultant solution to a glass base by spin coating, dip coating or the like. The above-described solvent is selected from ketones such as acetone and Cellosolves such as methyl Cellosolve and further amides such as dimethylformamide, ethers such as diethyl ether, esters such as methyl acetate, halogenated hydrocarbons such as chloroform and aromatic hydrocarbons such as benzene. They may be used alone or in any combination thereof.

A recording layer and optionally a protective layer, a dielectric layer, a reflecting layer, etc. may be provided in any order on the primer coating layer. The recording layer, protective layer, etc. may be provided by any of vapor deposition, sputtering, spin coating, etc.

EXAMPLE 1

Adhesion Test

A polymethyl methacrylate (hereinafter simply referred to as "P1") was dissolved in methyl isobutyl ketone to prepare a 2% by weight polymethyl methacrylate solution. A flat (track-free) glass base having a diameter of 130 mm was spin-coated at 900 rpm with the solution prepared above. The coated film was air-dried for 24 hr, and cuts having a width of 1 mm were provided on the film by means of a knife to form 100 square sections (10×10). A cellophane self-adhesive tape was applied thereon and immediately peeled off. The number of film sections remaining on the base was counted to examine the adhesion between the film and the base. As a result, it has been found that the film remained on all of 100 sections of the base. This base was allowed to stand in an oven kept at a temperature of 60° C. and a humidity of 90% for 100 hr. Then the base was taken out of the oven and the same adhesion test was conducted in another portion of the base. The film remained on all of 100 sections of the base. The results of the above-described adhesion tests are given in Table 1.

EXAMPLE 2

An experiment was conducted in the same manner as that of Example 1, except that a copolymer resin of methyl methacrylate with methyl acrylate (a copolymer composition ratio of 95 : 5; hereinafter simply referred to as "P2") was used instead of P1. As is apparent from Table 1, the adhesion between the film and the base was excellent.

COMPARATIVE EXAMPLE 1

An experiment was conducted in the same manner as that of Example 1, except that polystyrene (Toporex-550; a product of Mitsui Toatsu Chemicals, Inc.) was used instead of P1. The adhesion test was conducted in the same manner as that of Example 1. As is apparent from Table 1, the number of sections remaining on the base was 68 after 24 hr of coating and 0 after being allowed to stand at a temperature of 60° C. and a relative humidity of 90% for 100 hours.

TABLE 1

| | Coupling agent | Polymer used for coating of primer coating layer | Adhesion (number of remaining sections out of 100 sections) | |
|---|---|---|---|---|
| | | | after 24-hr air-drying following coating | after standing at 60° C. and 90% RH for 100 hr. |
| Ex. 1 | none | P1 | 100 | 100 |
| Ex. 2 | none | P2 | 100 | 100 |
| Comp. Ex. 1 | none | polystyrene | 68 | 0 |
| Ex. 5 | A-174 | P2 | 100 | 100 |
| | A-187 | P2 | 100 | 100 |
| | A-1100 | P2 | 100 | 100 |

EXAMPLES 3 AND COMPARATIVE EXAMPLE 2

Recording Sensitivity Test

Three kinds of disks were prepared by forming a thin film of a four-component alloy comprising tellurium, selenium, titanium, and silver by sputtering on flat glass bases respectively having thereon P1 and P2 layers as a primer coating layer formed in the same manner as that of Examples 1 and 2 and a flat glass base free from a primer coating layer as a comparative example.

For each disk, recording was conducted by means of a condensed semiconductor laser beam having a wavelength of 830 nm under recording conditions of a linear velocity of 4.2 m/sec at 1 MHz to examine the laser power necessary for forming a pit.

A pit was formed at 8 mW on the disk free from a primer coating layer, while a pit was formed at 4 mW on the disks respectively having P1 and P2 as the primer coating layer.

EXAMPLE 4 AND COMPARATIVE EXAMPLE 3

Test on Recording and Reproduction of Signal

The above-described P2 was dissolved in ethylene glycol monomethyl ether acetate to prepare a 0.7% by weight P2 solution. Two kinds of glass bases provided with a tracking groove (a diameter of 130 mm, a tracking pitch of 1.6 μm and groove widths of 0.5 μm in one base and 0.8 μm in another base; products of Asahi Glass Co., Ltd.) were spin-coated at 1100 rpm with the solution prepared above to provide a primer coating layer having an average thickness of 20 nm. Three kinds of optical information recording media were prepared by forming a thin film of a four-component alloy comprising tellurium, selenium, titanium, and silver by sputtering on the above-described base provided with a primer coating layer and the above-described glass base (a groove width of 0.5 μm) as a comparative example.

For each recording medium, a semiconductor laser beam having a wavelength of 830 nm was condensed and applied through the base to record and reproduce a signal. The recording of a signal was conducted by applying a pulse beam to between the grooves at a linear velocity of 4.2 m/sec and a power of 8 mW on the exposed surface and a recording frequency of 1 MHz. The reproduction of the signal was conducted by continuously applying a beam at a power of 1.0 mW on the exposed surface. The C/N ratio of the recording media provided with a primer coating layer was 53 dB (in the case of use of a base having a groove width of 0.5 μm) and 50 dB (in the case of use of a base having a groove width of 0.8 μm), while the C/N ratio of the recording medium free from a primer coating layer was 37 dB.

EXAMPLE 5

Test on Coupling Agent

The same flat glass base as that used in Example 1 was spin-coated with three coupling agents, i.e., a 1% solution of A-174, A-187 and A-1100, each a product of Nippon Unicar Co., Ltd. (the solvent used was butanol for A-1100 and ethylene glycol monomethyl ether acetate for A-174 and A-187) and then heat-treated at 130° C. for 30 min. The three treated bases were spin-coated with P2 in the same manner as that of Example 2, and the adhesion test was conducted in the same manner as that of Example 1. As is apparent from Table 1, the adhesion between the P2 film and the base was excellent for all of the bases.

Further, the three bases provided with a P2 primer coating layer prepared in the same manner as that described above were provided with a thin film of a four-component alloy comprising tellurium, selenium, titanium, and silver by sputtering in the same manner as that of Example 3, and the recording was conducted in the same manner as that of Example 3. As a result, for all of the recording media, a pit was formed at 4 mW.

As is apparent from the above-described results, an optical disk provided with a primer coating layer according to the present invention has an improved bonding strength and consequently exhibits an improved reliability as an optical disk and a remarkably improved recording sensitivity.

What is claimed is:

1. An optical information recording medium comprising a glass base, a primer coating layer formed on said glass base and a recording layer formed on said primer coating layer, wherein said primer coating layer consists essentially of a copolymer of methyl methacrylate and methyl acrylate, and wherein said recording layer consists essentially of a Te-Se alloy.

2. The recording medium of claim 1, wherein said glass base has a tracking groove.

3. The composition of claim 2, wherein said primer coating layer has a thickness of 0.001 to 0.1 microns.

4. The composition of claim 1, wherein said glass base is flat.

5. The composition of claim 4, wherein said primer coating layer has a thickness of 0.01 to 10 microns.

6. The composition of claim 1, wherein said copolymer of methyl methacrylate and methyl acrylate has a copolymer composition ratio of 95:5.

7. An optical information recording medium comprising a glass base, a primer coating layer formed on said glass base, a recording layer formed on said primer coating layer and a coupling agent for enhancing adhesion through interposition between said primer coating layer and said recording layer, wherein said primer coating layer consists essentially of a copolymer of methyl methacrylate and methyl acrylate, and wherein said recording layer consists essentially of a Te-Se alloy.

8. The composition of claim 7, wherein said glass base has a tracking groove.

9. The composition of claim 7, wherein said coupling agent is a silane coupling agent.

10. The composition of claim 7, wherein said copolymer of methyl methacrylate and methyl acrylate has a copolymer composition ratio of 95:5.

* * * * *